US006776292B1

(12) United States Patent
Nenno et al.

(10) Patent No.: US 6,776,292 B1
(45) Date of Patent: Aug. 17, 2004

(54) APPARATUS FOR SEPARATION OF SOLIDS IN FROTH

(75) Inventors: Vladimir E. Nenno, Kishinev (MD); Alexander V. Lashkul, Turku (FI); Jaakko O. Leppinen, Outokumpu (FI); Stig V. Bjorklof, Turku (FI)

(73) Assignees: EKO-Teknikka-Turku Oy, Littoinen (FI); Geologian Tutkimuskeskus, Outokumpu (FI)

( * ) Notice: Subject to any disclaimer, the term of this patent is extended or adjusted under 35 U.S.C. 154(b) by 0 days.

(21) Appl. No.: 09/914,179

(22) PCT Filed: Mar. 1, 2000

(86) PCT No.: PCT/FI00/00157

§ 371 (c)(1), (2), (4) Date: Sep. 21, 2001

(87) PCT Pub. No.: WO00/51744

PCT Pub. Date: Sep. 8, 2000

(30) Foreign Application Priority Data

Mar. 1, 1999 (FI) .................................................. 990436

(51) Int. Cl.[7] .............................. B03D 1/14; B01D 1/24

(52) U.S. Cl. ....................................... 209/168; 209/170

(58) Field of Search ................................ 209/168, 169, 209/170

(56) References Cited

U.S. PATENT DOCUMENTS 1,342,115 A * 6/1920 Janney
3,434,596 A 3/1969 Knaus
5,066,389 A * 11/1991 Zlobin et al.

FOREIGN PATENT DOCUMENTS

| | | | |
|---|---|---|---|
| DE | 392240 | | 3/1924 |
| SU | 644538 | * | 1/1979 |

OTHER PUBLICATIONS

Derwent Abstract of RU, 2067889, Zlobin, Oct. 20, 1996.

* cited by examiner

*Primary Examiner*—Thomas M. Lithgow
(74) *Attorney, Agent, or Firm*—Nixon & Vanderhye PC

(57) ABSTRACT

An apparatus for separation of solids in froth is presented. The apparatus includes: a housing (1), establishing a chamber (2) for flows of liquid and solid material and a froth bed (30) on the liquid; feeding means (14) for getting incoming material to be separated in contact with said froth bed (30); discharging means (6) for solid material near the bottom (12) of said housing (1); aerator means (24, 26) under the liquid surface (78) for creating bubbles and thus forming said bed of froth (30) and generating movement on the bed of froth (30); means for discharging froth from the housing (1) including at least a froth outlet (74). The apparatus is characterized by a surface (32) connected to said feeding means (14) so as to reduce the vertical speed component of the material being fed with the feeding means (14) from above said froth bed in and on to said froth bed (30).

16 Claims, 3 Drawing Sheets

APPARATUS FOR SEPARATION OF SOLIDS IN FROTH

This invention relates to a novel apparatus for separation of solids in froth as described in the preamble of appended independent patent claim.

This invention mainly pertains to froth separators used in mineral ore dressing machines. The present invention particularly refers to froth separators of the flotation type, in which pulp, pulverized ore mixed with water, is fed to the surface of a preliminary prepared froth layer. Such devices are intended for the separation of coarse grains of different minerals and materials and can be used in e.g. the metal industry, the construction materials industry or the mining industry.

A froth separation device is known from U.S. Pat. No. 4,274,949, the device including a reservoir having an inclined flat screen installed across the reservoir from one wall to the other. Froth generators are assembled inside the reservoir above the screen and several pulp feeding devices are located along the top of the separation device. Pulp is arranged to leak through the froth layer produced by froth generators. Tailings, i.e. particles which are not captured by the froth, fall through the screen and leave the reservoir together with the pulp flow. Separated froth product (captured particles and froth) leaves the process as a concentrate. The inclined screen causes the froth product to move towards an output opening on the bottom of the reservoir, through which opening the froth product is discharged. Removal of the tailings is organized through an opening in the bottom of the reservoir under the screen.

Another device for separation in froth is known from U.S. Pat. No. 4,469,591. In the device a continuously generated foam flux is transported along the outer surface of a horizontal drum, and mineral particles are deposited on the surface of the foam. Dense mineral particles fall through the foam but less dense particles stay on the upper surface of the foam. Floated particles together with the upper surface of the foam are skimmed away by blades, while the particles which passed through the foam stay on the drum and are transported away.

However, the devices described above have several shortcomings, such as low separation efficiency, the concentrate being contaminated by dirt (tailings), low stability of the dressing process due to fluctuations in the pulp feeding or froth thickness.

Further, from U.S. Pat. No. 3,815,739 is known a froth separation machine, which includes a chamber having installed therein a two layer bubble generator which is formed of perforated rubber hose pipes connected to a compressed air source. A slit-type airlift is located along the central longitudinal chamber axis. The machine is equipped with a distributor feeding device which distributes the pulp flux equally towards both sides of the machine. The device includes one chamber with a damper for pulp level adjustment and one for the coarse pulp fraction discharge. Inclined plates are placed under the bubble generators to guide the coarse sized fraction of the material down to the bottom of the chamber, where the inlet of the airlift is located. The airlift transports the material to the upper part of the machine, where this fraction is guided on to the froth surface. After the contact with the froth surface hydrophobic particles keep themselves on or in the froth and are discharged from the dressing process with the froth by mechanical froth skimmers. Hydrophilic and not floated particles fall down through the froth layer, slip down along the inclined planes, enter the airlift and are transported to the froth surface again and again.

The shortcomings of the described construction are:

the airlift in principle can not provide a stable enough feeding of the process;

high water content in the feed is needed because of the airlift use, which gives an opportunity for the hydrophobic particles in the water to slip through the froth layer, the use of the mechanical froth skimmers destroys the froth very efficiently; this leads to extra losses of useful mineral particles, which were already captured by the froth; this affects particularly to the coarsest mineral grains which are the most important to be separated, the machine is basically designed to work as a separate unit, and does not allow to create the flotation mineral dressing technological schemes further without additional stages of mechanical pumping for the tailings and the concentrate which will negatively affect onto the flotation efficiency.

It is also known from a British patent GB 1131649 an apparatus for separating mineral particles by a flotogravitation process.

The object of the present invention is to provide an improved apparatus for separation of solids in froth in which above mentioned shortcomings have been minimized.

The object of the present invention is also to provide an apparatus in which the efficiency of the separation of the coarse solid particles including minerals of about 1 mm size or more is improved.

The object is particularly to provide an apparatus for improved separation in froth process.

The objects presented above are fulfilled by an apparatus characterized by features mentioned in the characterizing portion of appended independent patent claim.

An typical apparatus for separation of solids in froth, according to the invention, includes a housing, delimited by two upper side walls, two upper end walls and a mainly funnel shaped bottom, the housing establishing a chamber for flows of liquid and solid material and a froth bed on the liquid, feeding means for getting incoming material to be separated in contact with said froth bed, discharging means for solid material near the bottom of said housing, aerator means under the liquid surface for creating bubbles and thus forming said froth bed on the liquid in the apparatus, said aerator means being constructed to generate a vertical flux of bubbles substantially nonhomogenous in a horizontal cross-section of the chamber, to generate a moving bed of froth on the liquid, means for discharging froth from the housing including at least a froth outlet, and a surface connected to said feeding means so as to reduce the vertical speed component of the material being fed with the feeding means from above said froth bed in and on to said froth bed.

The invention will be described in further detail below, by way of example, with reference to the accompanying drawings, in which FIG. 1 is a schematical view from above an apparatus according to one exemplary embodiment of the invention;

Figure 1:
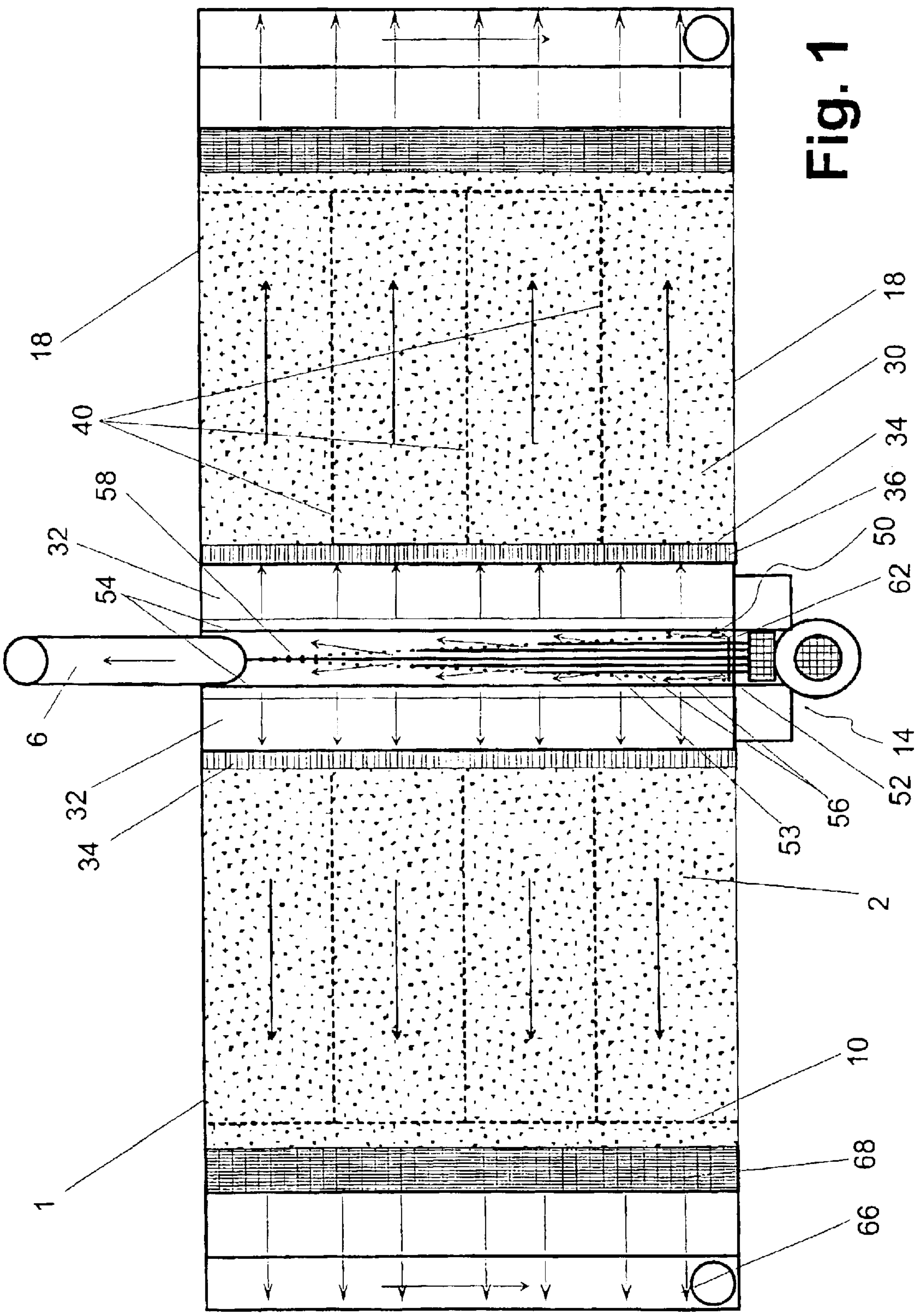

In the figures the movement of froth, liquid and solid material is schematically indicated by arrows. The apparatus shown in FIGS. 1–3 includes a housing 1, delimited by endwalls 10, sidewalls 18 and a bottom 12, and having two flotation chambers 2 therein and an intermediate channel 4 partly between said chambers 2. The intermediate channel 4 houses a tailings discharging device 6.

The chambers 2 and the channel 4 are in liquid connection with each other through their bottom portions, and are separated from each other by two partitions 8 symmetrically placed relatively to the vertical plane of symmetry of the housing 1. The partitions 8 are fixed to be parallel to the end walls 10 of the housing 1 and do not reach the bottom 12 of the housing 1, as best seen in FIG. 2.

A vibrator type feeding device 14 for feeding the flotation process with feeding material (pulp) is placed above the intermediate channel 4. The tailings discharging device 6, a screw conveyor, is installed partly within the intermediate channel 4 to reach from the bottom 12 of the housing to a level above the feeding device 14, as seen in FIG. 3.

Figure 3:
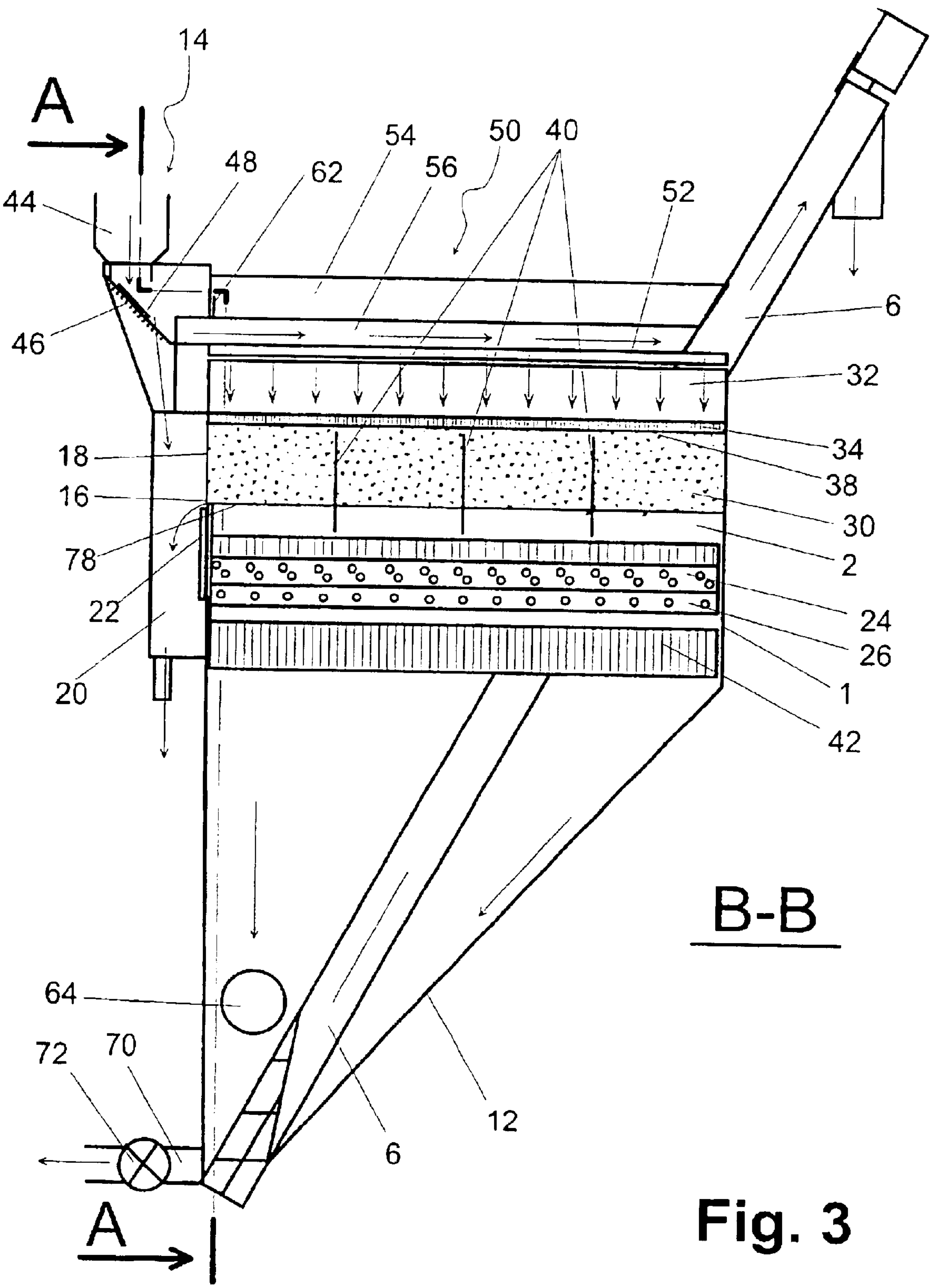
FIG. 3 is a cross sectional view of the apparatus in FIG. 1 taken along line B—B of FIG. 2.

A liquid overflow outlet 16, shown in FIG. 3, is arranged in between the partitions 8 in the side wall 18, below the feeding device 14 for discharging liquid from below the froth layer. A liquid collecting enclosure 20 is arranged outside the side wall 18 to collect liquid being discharged by overflow through the outlet 16. An adjustable slide 22 is arranged in front of the outlet 16 to adjust the overflow level, i.e. the level of the liquid.

Figure 2:
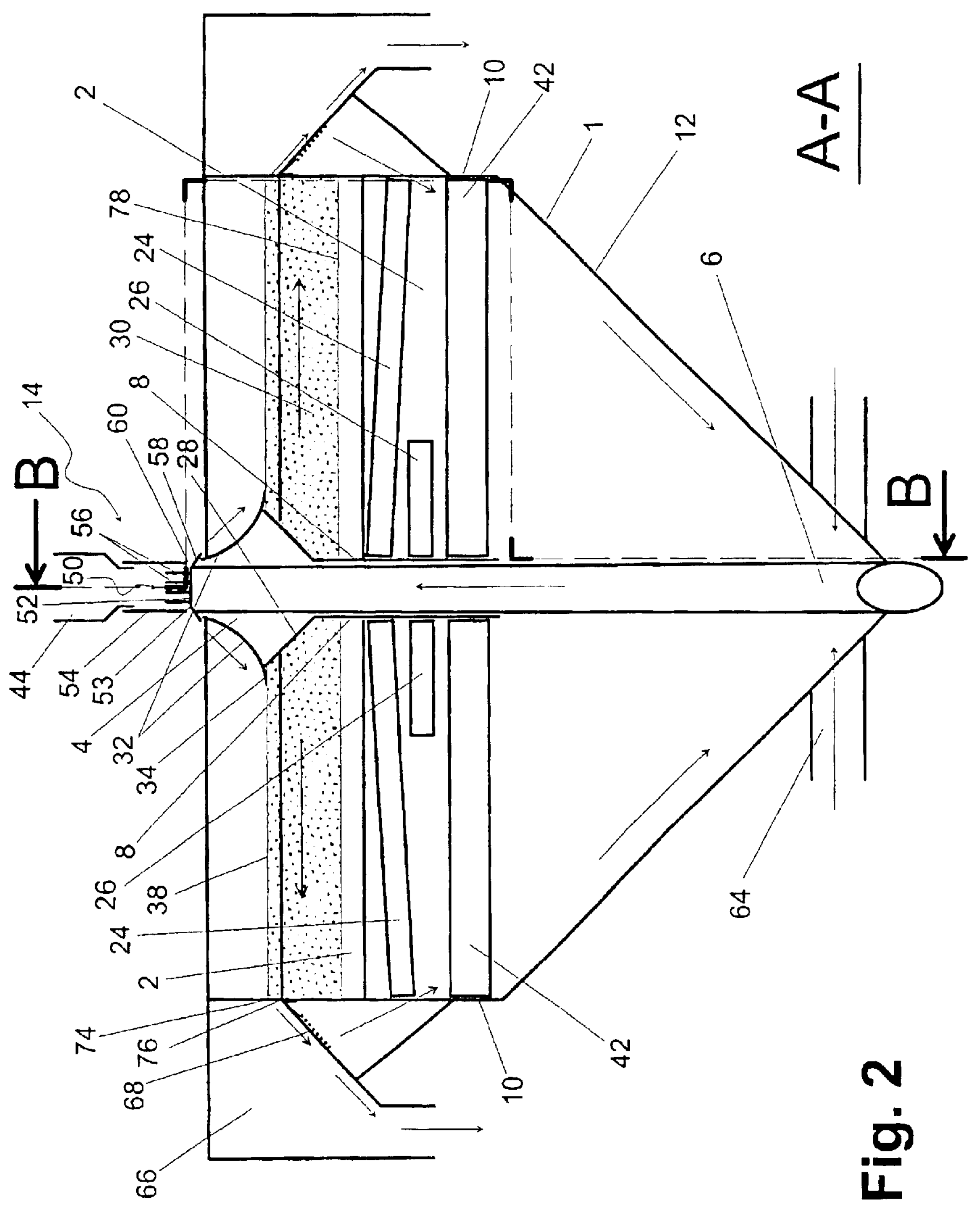
FIG. 2 is a cross sectional view of the apparatus in FIG. 1 taken along line A—A of FIG. 3.

Aerators or bubble generators 24 and 26, as best seen in FIG. 2, are installed one above the other within chambers 2. The bubble generators include air distributors and air dispersants, made of perforated rubber hose pipes connected to a compressed air source. Other kind of aerators are also possible. The aerators 24, 26 provide a froth layer 30 on top of the liquid in the housing 1.

The first or main aerators 24 mainly cover the whole cross sections of chambers 2. The second or additional aerators 26 cover up to ⅔ or less of the cross sections of the chambers 2. The second aerators 26 are located at the feeding device side of the chambers 2. The second aerators 26 are preferably arranged below the main aerator but could be arranged above them if desired.

The main aerator 24 may be installed horizontally or downwards inclined by an angle up to 30° in the direction of the wanted froth motion. Both aerators 24 and 26 are installed below the overflow level of slide 22 and are permanently inserted in the liquid.

FIG. 2 shows that the partitions 8 are at their upper parts equipped with reflective plates 28 or bent to form reflective plates 28, which bend outwards from the intermediate channel 4 towards the end walls 10 in the chambers 2. The reflective plate 28 provides in the froth layer 30 a froth motion in a direction from the partitions 8 towards end walls 10 i.e. in a direction parallel to the side walls 18.

A curvilinear concave plate or surface 32 is arranged above the reflective plate 28 and connected thereto. The concave plate 32 is arranged to guide feed material from the feeding device 14 into the froth layer 30 in the direction of the froth motion. An edge plate 34 with a comb shape is connected in both chambers 2 to the lower ends of the concave plate 32 in such a way that the comb teeth 36 extend in the direction of the froth motion and mainly tangentially to the froth surface 38.

Inside the chambers 2 between the froth surface 38 and the aerators 24 equidistant vertical partition plates 40 mainly parallel to the froth motion and to the side walls 18 are installed, as best seen in FIGS. 1 and 3.

FIGS. 2 and 3 show an electrode system 42 assembled from flat parallel metal electrodes installed under the aerators 24 and 26.

The vibrator type feeding device 14 includes a primary inlet chamber 44 arranged above the other end of the intermediate channel 4. The chamber 44 is provided with an inclined perforated bottom 46, as seen in FIG. 3, partly or completely closed by an adjustable damper plate 48. The feeding device 14 further includes a gutter like element, the gutter 50, arranged above the intermediate channel 4 and reaching mainly from one side wall 18 to the other side wall 18. The gutter 50 consists of a bottom plate 52, vertical side walls 54 and a number of vertical partitions 56 extending different lengths from the first end towards the other end of the gutter 50, as best seen in FIG. 1. The gutter 50 is preferably inclined downwards towards its feed direction.

FIG. 2 shows that the longitudinal sides or edge portions 58 of the gutter bottom 52 are inclined downwards towards the chambers 2. As can be seen in FIG. 1 only a small end portion of the sides 58 of the bottom 52 is bent downward at the inlet end of the gutter. The width of the bent portion increases along the gutter, so that both halves of the bottom 52 are almost totally bent downwards at the other end of the gutter. Edge 53 of the bottom 52, along which the bottom plate is bent, is shown in FIG. 1 with a dashed line.

The side walls 54 of the gutter 50 do not reach the bottom of the gutter, so that a pulp feeding open slot 60 is formed between side walls 54 and the longitudinal sides 58 of the bottom. A vertical baffle plate 62 parallel with side walls 18 is installed between the primary chamber 44 and the gutter 50 at a distance above the bottom 52 of the gutter, allowing adjustment of the feed material layer flowing from chamber 44 into the gutter 50.

Openings 64 for introducing dressed products from other apparatuses into the tailings discharge device 6, i.e. the screw conveyor, and for adding process water into the housing may be located above the lowest end of the device 6.

FIG. 2 shows froth receivers 66 with inclined perforated bottoms 68 connected to the end walls 10 of the housing 1. Openings 74 with overflow edges 76 are formed in the end walls 10 between chambers 2 and froth receivers 66.

The apparatus works as follows:

The housing 1 is filled by water mixed with a frothing agent through the openings 64 until water will start to flow over the overflow slide 16 into the liquid collecting enclosure 20. The water level 78 and the thickness of the froth layer 30 depend on the position of the adjustable overflow slide 16.

Aerators 24 and 26 are connected to compressed air sources (which are not shown in the pictures) for providing the necessary air pressure.

Froth motion from feeding device 14 towards side walls 18 is created by means of a noneven, or nonhomogenous, distribution of gas bubbles discharged by the aerators 24 and 26. The quantity of gas discharged gets smaller from the feeding device 14 towards the froth receiver 66, that is, aerators 24 and 26 generate a vertical flux of bubbles substantially nonhomogenous in a horizontal cross-section of the chamber 2, to generate a moving bed of froth on the liquid, said froth moving from the region of the greater flow of bubbles to the region of the smaller flow of bubbles. Such noneven distribution of the gas bubbles in the liquid volume above the aerators 24 and 26 can be realized by one aerator having a noneven gas distribution or by two or more aerators having an even distribution of gas from gas discharging elements in every aerator but the aerators being arranged nonevenly one above the other, as is the case in the example shown in FIGS. 1–3. The same effect can be obtained in many ways, for example, by arranging the aerators nonsymmetrically in the chambers 2.

In the apparatus shown in FIGS. 1–3 the main aerators 24 create a froth pillow which takes up the flotable part of the pulp being fed. The additional aerators 26 which are located close to the feeding device side of the chambers 2 create a redundant froth flux above themselves which after being reflected from the reflective plates 28 causes the whole froth layer 30 to flow towards the froth receiver 66.

By changing the air flux with the additional aerator 26 it is possible to vary smoothly in a wide range the speed of the froth layer 30. This is very important for the optimization of the process in the apparatus.

Noneven distribution of the gas bubbles in the chambers 2 can be achieved also by the inclination of the main aerator 24 downwards towards the froth receiver 66, as the air volume which discharges from the different parts of the aerator depends strongly on the hydrostatic pressure around the discharge openings of the aerator.

The best solution seems, however, to be the use of two or more different aerators, independent main aerator 24 and additional smaller aerators 26. This allows an independent control of froth speed. In this way it is possible to regulate the froth speed and the froth properties completely independently.

Previously conditioned pulp, e.g. mixed with certain chemicals, is served into the feeding device 14. Water is separated from the pulp while flowing over the inclined perforated bottom 46 of the primary box 44, partly or completely covered by a damper 48. The water separated from the pulp flows into the enclosure 20 while the pulp, which now is concentrated to a desired level, enters the inclined gutter 50 and is distributed evenly into the spaces between the vertical partitions 56 by the baffle plate 62. The pulp moves along the inclined gutter 50 by means of vibration. The surface of the inclined gutter 50 along which the pulp is moving gets narrower towards the other end because the bottom 52 of the gutter 50 due to its bent side portions has a triangular shape, i.e. the sides 58 of the gutter 50 being inclined towards the chambers 2. The pulp which moves along the gutter 50 starts to slide along the inclined sides 58 when it reaches edge 53 of the triangular bottom 52 of the gutter 50. The adjustable distance between the inclined sides 58 and the side walls 54 allows to distribute the pulp evenly along the side walls 54.

Conditioned solid particles of the pulp pass between the side plate 54 and gutter side 58 and further slide along the concave surface 32 towards its comb shaped edge 34. The solid particles loose most of their vertical velocity component when sliding along the concave surface 32 and enter the froth tangentially to the froth surface 38. Froth flowing up between the teeth 36 of the comb shaped surface 34, captures the solid particles and transports them horizontally. During this transportation hydrophobic particles are attached to the froth bubbles, which keeps the particles on or in the froth 30 so that they are transported by the froth to the froth receiver 66. Hydrophilic and not floating particles fall down through the froth layer 30, slip down along the inclined bottom planes 12 of the housing 1 and enter the discharge device 6, e.g. a screw conveyor. The discharge device 6 transports the bottom product ore to the next apparatus for further concentrating or removes it from the dressing process completely. In the lowest part of the housing 1 a pipe 70 with a valve 72 is arranged for allowing a complete emptying of the apparatus, if necessary.

The froth together with the floated particles flows over the overflow edge 76 to the froth receiver 66 and further along the inclined perforated bottom plate 68 thereof. Froth disappears in the froth receiver 66, and water arising as a result of this process leaks through the perforated plate 68 and returns to the chambers 2. The solid particles separated from the froth product leave the apparatus when sliding along the specially prepared inclined surfaces 68.

Vertical partitions 40 in chambers 2 which are parallel to the froth motion are installed in the chambers 2 between the froth surface 38 and the aerators 24 and 26 with the aim to prevent the appearance of the nondesired transverse froth flow in the apparatus.

In the chambers 2 under the aerators 24 and 26 a flat parallel electrode system 42 for the electrolysis of the liquid part of the pulp may be installed. The aim of this would be the changing of the rheological froth properties by means of introducing electrolytic gas bubbles of the micrometer size into the froth.

The proposed apparatus provides an increase in productivity of the froth separation process by means of optimization of the aero- and hydrodynamic regimes. The apparatus makes possible an efficient mineral dressing of coarse solid grains of a millimeter size and shifts the size limit for the flotable particles up to 2.5–4.0 mm.

An apparatus according to the invention has been tested with various tests. Here are presented results from two test cases. A group of diamonds of different sizes was mixed with kimberlite sand and the apparatus was provided with the mix as feed material after certain conditioning. The same set of diamonds was used in both test cases, weights of the diamonds varying between 7 mg and 62,2 mg and their sizes varying between approximately 1 mm and 3 mm. Two different foam agents were used, Montanol 300 and Montanol 500 (both produced by Clariant GmbH, Germany), both mixed with water with a concentration of 0,1 ml/l. The air flux from the aerators was constant, 30 liters per minute. The results are shown in the following Table 1 for the Montanol 300 case and Table 2 for the Montanol 500 case. A diamond separated successfully with the froth is indicated with number 1 and a diamond that fell to the bottom of the apparatus is indicated with number 0. Weight in milligrams for every diamond and classes of the diamonds indicating the size of the diamonds in millimeters are also shown on the tables.

From the results of the test cases we can see that almost all of the diamonds under the weight of 40 mg or under the size of 2.5 mm are separated with the froth. This proves the usefulness of the apparatus for separation of solids in froth.

While the invention has been described mainly in connection with what is presently considered as the most preferred embodiments of the invention, it is naturally clear that the invention is not to be limited to the disclosed embodiments, but on the contrary, is intended to cover all modifications and equivalent arrangements in the scope of the following claims.

TABLE 1
| | WEIGHT | CLASS− | CLASS+ |
|---|---|---|---|
| 1 | 7 | −2 | 1 |
| 1 | 8.4 | | |
| 1 | 8.9 | | |
| 1 | 9 | | |
| 1 | 9.2 | | |
| 1 | 9.5 | | |
| 1 | 9.7 | | |
| 1 | 10 | | |
| 1 | 10.2 | | |
| 1 | 11 | −2 | 1 |
| 1 | 17.1 | −2.5 | 2 |
| 1 | 23 | | |
| 1 | 24.1 | | |
| 1 | 26.2 | | |
| 1 | 28.3 | | |
| 1 | 30.2 | | |
| 0 | 31.2 | | |
| 1 | 31.9 | | |
| 1 | 33 | | |
| 0 | 41.3 | −2.5 | 2 |
| 1 | 27.7 | −2.8 | 2.5 |
| 1 | 32 | | |
| 1 | 32.4 | | |
| 1 | 32.7 | | |
| 1 | 42.1 | | |
| 0 | 42.9 | | |
| 0 | 48.8 | | |
| 0 | 50.1 | | |
| 0 | 51.5 | | |
| 0 | 56.3 | −2.8 | 2.5 |
| 1 | 41.6 | −3.3 | 2.8 |
| 0 | 45.3 | | |
| 0 | 50.9 | | |
| 0 | 56 | | |
| 0 | 62.2 | −3.3 | 2.8 |
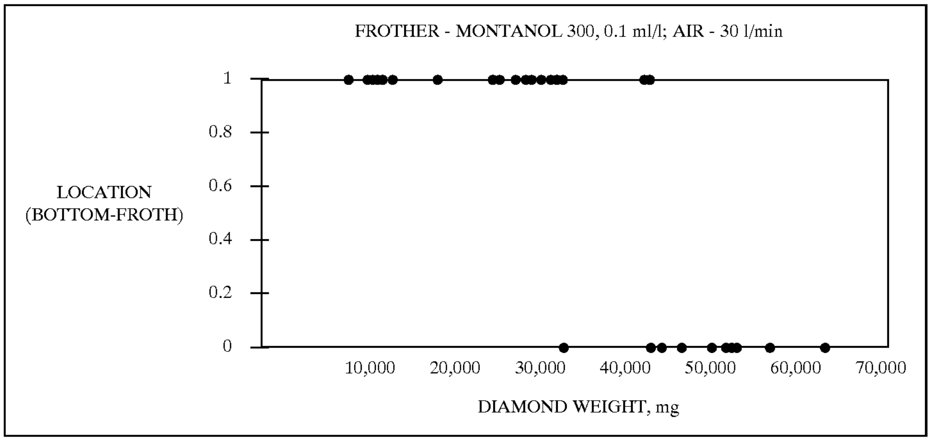
TABLE 2
| | WEIGHT | CLASS− | CLASS+ |
|---|---|---|---|
| 1 | 7 | −2 | 1 |
| 1 | 8.4 | | |
| 1 | 8.9 | | |
| 1 | 9 | | |
| 1 | 9.2 | | |
| 1 | 9.5 | | |
| 1 | 9.7 | | |
| 1 | 10 | | |
| 1 | 10.2 | | |
| 1 | 11 | −2 | 1 |
| 1 | 17.1 | −2.5 | 2 |
| 1 | 23 | | |

TABLE 2-continued

| | | | |
|---|---|---|---|
| 1 | 24.1 | | |
| 1 | 26.2 | | |
| 1 | 28.3 | | |
| 1 | 30.2 | | |
| 1 | 31.2 | | |
| 1 | 31.9 | | |
| 1 | 33 | | |
| 0 | 41.3 | −2.5 | 2 |
| 1 | 27.7 | −2.8 | 2.5 |
| 1 | 32 | | |
| 1 | 32.4 | | |
| 1 | 32.7 | | |
| 0 | 42.1 | | |
| 1 | 42.9 | | |
| 0 | 48.8 | | |
| 0 | 50.1 | | |
| 0 | 51.5 | | |
| 0 | 56.3 | −2.8 | 2.5 |
| 0 | 41.6 | −3.3 | 2.8 |
| 0 | 45.3 | | |
| 0 | 50.9 | | |
| 0 | 56 | | |
| 0 | 62.2 | −3.3 | 2.8 |

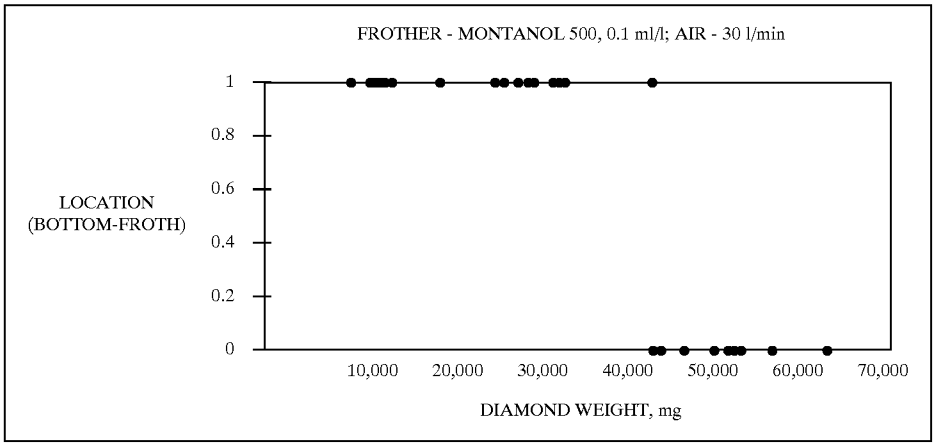

What is claimed is:

1. An apparatus for separation of solids in froth, comprising:

a housing, delimited by two upper side walls, two upper end walls and a mainly funnel shaped bottom, the housing establishing a chamber for flows of liquid and solid material and a froth bed on the liquid;

feeding means for getting incoming material to be separated in contact with said froth bed;

discharging means for solid material near the bottom of said housing;

aerator means under the liquid surface for creating bubbles and thus forming said froth bed on the liquid in the apparatus, said aerator means being constructed to generate a vertical flux of bubbles substantially non-homogenous in a horizontal cross-section of the chamber, to generate a moving bed of froth on the liquid;

means for discharging froth from the housing including at least a froth outlet;

a surface connected to said feeding means so as to reduce the vertical speed component of the material being fed with the feeding means along which surface the material being fed is introduced from above said froth bed in and on to said froth bed; and one or more vertical plates installed inside the chamber substantially parallel to the direction of the froth motion, wherein said aerator means comprises a main bubble generator and at least one additional bubble generator, said main and at least one additional bubble generators being installed at least partly one above another, each of the main and at least one additional bubble generators by itself creating in the horizontal cross-section a homogenous flow of bubbles, the main bubble generator covering substantially the whole length of a horizontal section of the chamber in the direction of the froth motion, and the at least one additional bubble generator covering two-thirds or less of the length of the chamber in the direction of the froth motion starting from the start point of the horizontal froth motion.

2. An apparatus for separation of solids in froth, comprising:

a housing, delimited by two upper side walls, two upper end walls and a mainly funnel shaped bottom, the housing establishing a chamber for flows of liquid and solid material and a froth bed on the liquid;

feeding means for getting incoming material to be separated in contact with said froth bed;

discharging means for solid material near the bottom of said housing;

aerator means under the liquid surface for creating bubbles and thus forming said froth bed on the liquid in the apparatus, said aerator means being constructed to generate a vertical flux of bubbles substantially non-homogenous in a horizontal cross-section of the chamber, to generate a moving bed of froth on the liquid;

means for discharging froth from the housing including at least a froth outlet;

a surface connected to said feeding means so as to reduce the vertical speed component of the material being fed with the feeding means along which surface the material being fed is introduced from above said froth bed in and on to said froth bed; and one or more vertical plates installed inside the chamber substantially parallel to the direction of the froth motion, wherein said plates cover substantially the whole length of a horizontal section of the chamber.

3. An apparatus for separation of solids in froth, comprising:

a housing, delimited by two upper side walls, two upper end walls and a mainly funnel shaped bottom, the housing establishing a chamber for flows of liquid and solid material and a froth bed on the liquid;

feeding means for getting incoming material to be separated in contact with said froth bed;

discharging means for solid material near the bottom of said housing;

aerator means under the liquid surface for creating bubbles and thus forming said froth bed on the liquid in the apparatus, said aerator means being constructed to generate a vertical flux of bubbles substantially non-homogenous in a horizontal cross-section of the chamber, to generate a moving bed of froth on the liquid;

means for discharging froth from the housing including at least a froth outlet;

a surface connected to said feeding means so as to reduce the vertical speed component of the material being fed with the feeding means along which surface the material being fed is introduced from above said froth bed in and on to said froth bed;

one or more vertical plates installed inside the chamber substantially parallel to the direction of the froth motion, and a flat parallel electrode system for electrolysis installed under the aerator means.

4. An apparatus for separation of solids in froth, comprising:

a housing, delimited by two upper side walls, two upper end walls and a mainly funnel shaped bottom, the housing establishing a chamber for flows of liquid and solid material and a froth bed on the liquid;

feeding means for getting incoming material to be separated in contact with said froth bed;

discharging means for solid material near the bottom of said housing;

aerator means under the liquid surface for creating bubbles and thus forming said froth bed on the liquid in the apparatus, said aerator means being constructed to generate a vertical flux of bubbles substantially non-homogenous in a horizontal cross-section of the chamber, to generate a moving bed of froth on the liquid;

means for discharging froth from the housing including at least a froth outlet;

a surface connected to said feeding means so as to reduce the vertical speed component of the material being fed with the feeding means along which surface the material being fed is introduced from above said froth bed in and on to said froth bed; and one or more vertical plates installed inside the chamber substantially parallel to the direction of the froth motion, wherein said feeding means includes a primary chamber with an inclined perforated bottom, said primary chamber being connected to an inclined gutter divided by longitudinal partitions; said gutter being assembled to be vibrated during use, and wherein longitudinal sides of the gutter bottom are inclined downwards towards the chamber.

5. An apparatus as in any one of claims 1–4, wherein said aerator means includes an aerator that is inclined downwards by an angle up to 30 degrees from a horizontal level in the direction of the froth motion.

6. An apparatus as in any one of claims 1–4, further comprising a reflective plate installed above a part of the chamber where vertical flow of bubbles from the aerator means is at a maximum, said reflective plate being inclined upwards in the direction of the froth motion so that vertical motion of the rising bubbles is turned into a horizontal motion of the froth bed in a direction towards the froth outlet.

7. An apparatus as in any one of claims 1–4, wherein the apparatus includes two or more chambers for flows of liquid and solid material and a froth bed on the liquid, said two or more chambers being partly separated from each other by at least one partition placed parallel to and between the two upper end walls, said two or more chambers being connected with each other by liquid.

8. An apparatus as in any one of claims 1–4, wherein said feeding means is installed above an end wall or above a partition between the two end walls, said feeding means being installed so that the feed material from said feeding means is distributed substantially equally along the whole length of the said end wall or partition.

9. An apparatus as in any one of claims 1–4, further comprising adjusting means for adjusting the amount of liquid discharged from the housing, to thereby enable adjustment of liquid level in the housing and/or to adjust the height of the froth bed.

10. An apparatus as in any one of claims 1–4, further comprising a froth receiver installed at the froth outlet, said froth receiver having an inclined and at least partly perforated bottom.

11. An apparatus as in any one of claims 1–4, wherein said feeding means includes a longitudinal edge disposed substantially transverse to the direction of the froth motion, said edge serving to increase contact area between the feed material and the froth bed, wherein feed material is transported over said edge to be fed in and on to the froth bed.

12. An apparatus as in claim 11, wherein said longitudinal edge is comb-shaped with teeth pointing in the direction of the froth motion.

13. An apparatus as in claim 2, 3, or 4, wherein said aerator means comprises a main bubble generator and at least one additional bubble generator, said main and at least one additional bubble generators being installed at least partly one above another, each of the main and at least one additional bubble generators by itself creating in the horizontal cross-section a homogenous flow of bubbles, the main bubble generator covering substantially the whole length of a horizontal section of the chamber in the direction of the froth motion, and the at least one additional bubble generator covering two-thirds or less of the length of the chamber in the direction of the froth motion starting from the start point of the horizontal froth motion.

14. An apparatus as in claim 1, 3, or 4, wherein said plates cover substantially the whole length of a horizontal section of the chamber.

15. An apparatus as in claim 1, 2, or 4, further comprising a flat parallel electrode system for electrolysis installed under the aerator means.

16. An apparatus as in claim 1, 2, or 3, wherein said feeding means includes a primary chamber with an inclined perforated bottom, said primary chamber being connected to an inclined gutter divided by longitudinal partitions; said gutter being assembled to be vibrated during use, and wherein longitudinal sides of the gutter bottom are inclined downwards towards the chamber.

* * * * *